(12) United States Patent
Wang et al.

(10) Patent No.: US 11,395,294 B2
(45) Date of Patent: Jul. 19, 2022

(54) METHOD AND APPARATUS FOR RESOURCE SELECTION OF MULTIPLE TRANSMISSION OCCASIONS IN NEW RADIO SIDELINK COMMUNICATIONS

(71) Applicant: MediaTek Inc., Hsinchu (TW)

(72) Inventors: Chien-Yi Wang, Hsinchu (TW); Ju-Ya Chen, Hsinchu (TW)

(73) Assignee: MediaTek Inc.

( * ) Notice: Subject to any disclaimer, the term of this patent is extended or adjusted under 35 U.S.C. 154(b) by 107 days.

(21) Appl. No.: 16/927,158

(22) Filed: Jul. 13, 2020

(65) Prior Publication Data

US 2021/0051654 A1 Feb. 18, 2021

Related U.S. Application Data

(60) Provisional application No. 62/972,089, filed on Feb. 10, 2020, provisional application No. 62/888,070, filed on Aug. 16, 2019.

(51) Int. Cl.
*H04W 72/04* (2009.01)
*H04W 72/12* (2009.01)
(Continued)

(52) U.S. Cl.
CPC ....... *H04W 72/0446* (2013.01); *H04L 1/1812* (2013.01); *H04W 4/40* (2018.02); *H04W 72/0406* (2013.01); *H04W 72/12* (2013.01)

(58) Field of Classification Search
CPC ....... H04L 1/0001; H04L 1/1812–1819; H04L 1/1887; H04L 5/0082–0083; H04L 5/0094; H04L 47/10; H04W 4/40–48; H04W 4/70; H04W 8/20; H04W 28/065; H04W 28/10; H04W 36/0072; H04W 52/0216; H04W 72/02; H04W 72/04; H04W 72/0406–0433; H04W 72/0446; H04W 72/085; H04W 72/12–14; H04W 76/28
See application file for complete search history.

(56) References Cited

U.S. PATENT DOCUMENTS

2018/0279259 A1* 9/2018 Gulati .................. H04W 24/08
2019/0230643 A1* 7/2019 Chae .................... H04W 72/04
(Continued)

FOREIGN PATENT DOCUMENTS

CA 3033450 A1 * 2/2018 .......... H04W 72/085
CN 11246426 A * 6/2020 .............. H04W 4/40
(Continued)

*Primary Examiner* — Thomas R Cairns
(74) *Attorney, Agent, or Firm* — Han IP PLLC; Andy M. Han

(57) ABSTRACT

Various solutions for resource selection of multiple transmission occasions in new radio (NR) sidelink communications with respect to user equipment and network apparatus in mobile communications are described. An apparatus may select a first transmission resource from a resource selection window. The apparatus may determine a maximum time gap and a minimum time gap. The apparatus may select a second transmission resource according to the maximum time gap and the minimum time gap. The apparatus may inform the first transmission resource and the second transmission resource to a peer apparatus.

16 Claims, 5 Drawing Sheets

(51) Int. Cl.
*H04L 1/18* (2006.01)
*H04W 4/40* (2018.01)

(56) References Cited

U.S. PATENT DOCUMENTS

2020/0029245 A1* 1/2020 Khoryaev ............ H04B 17/318
2020/0029340 A1* 1/2020 He ........................ H04W 72/02
2020/0374861 A1* 11/2020 Shilov ............... H04W 72/0406
2021/0007096 A1* 1/2021 Huang .............. H04W 72/0406
2021/0314916 A1* 10/2021 Fouad ................. H04W 72/082

FOREIGN PATENT DOCUMENTS

| TW | 202133653 A * | 2/2021 | ............. H04W 4/40 |
| WO | WO-2018030825 A1 * | 2/2018 | ............ H04W 72/02 |
| WO | WO-2021060936 A1 * | 4/2021 | ........... H04L 1/1825 |
| WO | WO-2021071228 A1 * | 4/2021 | ............ H04W 92/18 |
| WO | WO-2021091267 A1 * | 5/2021 | ............ H04W 72/02 |
| WO | WO-2021167529 A1 * | 8/2021 | ............. H04W 4/40 |
| WO | WO-2021204845 A1 * | 10/2021 | ........ H04W 74/0816 |

* cited by examiner

METHOD AND APPARATUS FOR RESOURCE SELECTION OF MULTIPLE TRANSMISSION OCCASIONS IN NEW RADIO SIDELINK COMMUNICATIONS

CROSS REFERENCE TO RELATED PATENT APPLICATION(S)

The present disclosure claims the priority benefit of U.S. Provisional Patent Application No. 62/888,070, filed 16 Aug. 2019, and U.S. Provisional Patent Application No. 62/972,089, filed 10 Feb. 2020. The contents of aforementioned applications are herein incorporated by reference in their entirety.

TECHNICAL FIELD

The present disclosure is generally related to mobile communications and, more particularly, to resource selection of multiple transmission occasions in new radio (NR) sidelink communications with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) vehicle to everything (V2X) or NR V2X, sidelink was proposed for direct communication between two devices without going through a base station. How to determine the resource allocation for sidelink transmissions is further discussed. It was agreed that two resource allocation modes, Mode 1 and Mode 2, are supported in New Radio (NR) V2X. In Mode 1, a base station can schedule sidelink resources to be used by a transmit (Tx) user equipment (UE) for sidelink transmission, which can be regarded as centralized scheduling method. In Mode 2, a UE should determine sidelink transmission resources within sidelink resources configured by base station or pre-configured. This can be regarded as distributed scheduling method. Mode 2 is a sidelink resource allocation for transmission with UE autonomous selection. Therefore, how to select resources for transmission with as small interference by other UEs as possible becomes a critical issue in NR V2X.

Accordingly, how to design resource selection procedure to avid interference and improve performance between UEs becomes an important issue in the newly developed wireless communication network. Therefore, there is a need to provide proper schemes for resource selection of multiple transmission occasions in NR sidelink communications to meet the requirements in NR V2X network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to resource selection of multiple transmission occasions in NR sidelink communications with respect to user equipment and network apparatus in mobile communications.

In one aspect, a method may involve an apparatus selecting a first transmission resource from a resource selection window. The method may also involve the apparatus determining a maximum time gap and a minimum time gap. The method may further involve the apparatus selecting a second transmission resource according to the maximum time gap and the minimum time gap. The method may further involve the apparatus informing the first selected transmission resource and the second selected transmission resource to at least one peer apparatus.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising selecting a first transmission resource from a resource selection window. The processor may also perform operations comprising determining a maximum time gap and a minimum time gap. The processor may further perform operations comprising selecting a second transmission resource according to the maximum time gap and the minimum time gap. The processor may further perform operations comprising informing, via the transceiver, the first selected transmission resource and the second selected transmission resource to a peer apparatus.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
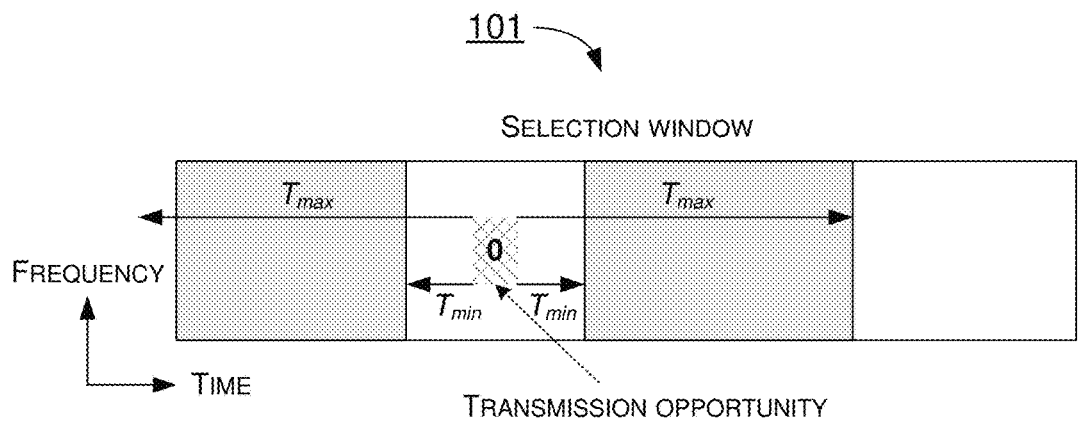
FIG. 1 is a diagram depicting example scenarios under schemes in accordance with implementations of the present disclosure.
Figure 1:
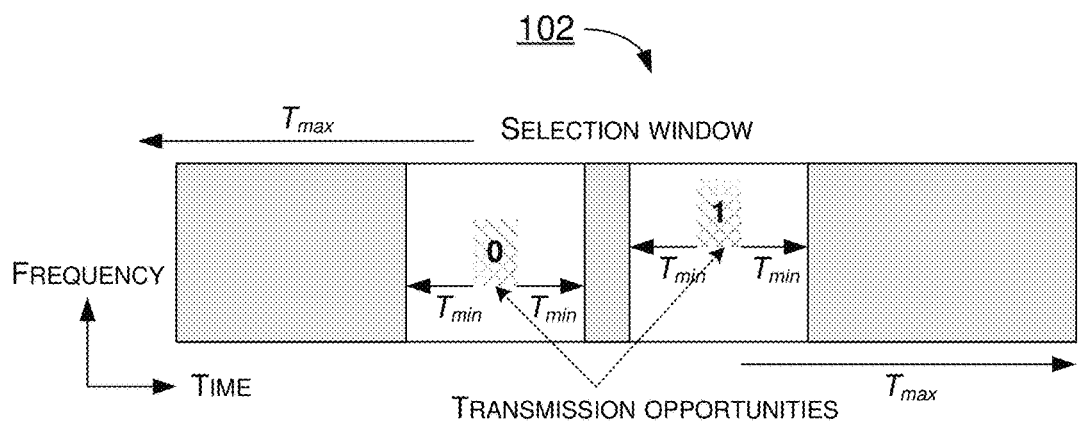
Figure 1:
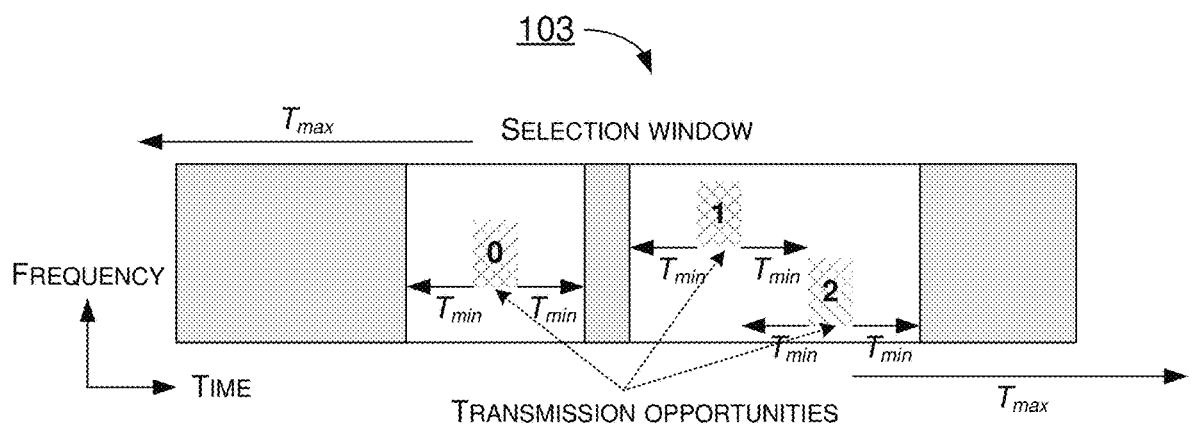

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to resource selection of multiple transmission occasions in NR sidelink communications with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE vehicle to everything (V2X) or NR V2X, sidelink was proposed for direct communication between two devices without going through a base station. How to determine the resource allocation for sidelink transmissions is further discussed. It was agreed that two resource allocation modes, Mode 1 and Mode 2, are supported in NR V2X. In Mode 1, a base station can schedule sidelink resources to be used by a transmit (Tx) UE for sidelink transmission, which can be regarded as centralized scheduling method. In Mode 2, a UE should determine sidelink transmission resources within sidelink resources configured by base station or pre-configured. This can be regarded as distributed scheduling method. Mode 2 is a sidelink resource allocation for transmission with UE autonomous selection. Therefore, how to select resources for transmission with as small interference by other UEs as possible becomes a critical issue in NR V2X.

Sensing-based resource selection was adopted by both LTE V2X and NR V2X to enhance reliability and resource efficiency. The sensing procedure includes decoding sidelink control information (SCI), sidelink measurements and detection of sidelink transmissions to identify the occupied resources. Information extracted from SCI decoding may include current time/frequency resource allocation, reservation period, retransmission time gap, retransmission frequency resource allocation, and priority of the packet. If all SCIs can be decoded by UE in each slot, UE would have whole resources allocation information of current slot and resource reservation information of future slots. One transmission can reserve resource(s) for current and future transmissions through SCI.

Based on measured reference symbol received power (RSRP) of decoded SCIs, a UE may determine whether the interference is tolerable so as to use/reuse a time-frequency resource. More specifically, the measured RSRP is compared with a threshold to identify the occupied resource. If the measured RSRP is higher than the threshold, any resource candidate overlapping with a sub-channel reserved by this SCI is excluded. This means that the excluded sub-channel may be used by other UEs or may incur high interference. If the measured RSRP is less than the threshold, a UE can assume the interference is tolerable and thus the same resource can be used/reused.

For LTE V2X, a transport block (TB) has at most 2 hybrid automatic repeat request (HARQ) transmissions/retransmissions, and an SCI can signal up to two reserved resources. For NR V2X, a TB can be configured to have at most 32 HARQ transmissions/retransmissions, and an SCI can be configured to signal up to $N_{MAX}$ reserved resources. It is agreed that the reserved resources signaled in one SCI should be within 32 slots. Thus, it is desirable that the time gap between any two selected resources are within 32 slots so that all resources except the first one can be reserved by one prior SCI. On the other hand, NR V2X supports feedback-based retransmission. Thus, a time gap is required between transmissions to accommodate HARQ round-trip time. Therefore, there is a need to provide proper schemes for resource selection in NR sidelink communications to meet the above requirements.

In view of the above, the present disclosure proposes a number of schemes pertaining to resource selection of multiple transmission occasions with respect to the UE and the network apparatus. According to the schemes of the present disclosure, the UE may determine a maximum time gap and a minimum time gap. The maximum time gap may be designed to guarantee that the reserved resources signaled in one SCI are within 32 slots. The minimum time gap may be designed to accommodate the HARQ round-trip time between transmissions. The UE may select a plurality of transmission resources according to the maximum time gap, the minimum time gap and the proposed resource selection criteria. Then the UE may inform the information of the selected transmission resources to other UEs via SCI. Accordingly, the UE may be able to meet the requirements of reserving resources via SCI and also support HARQ feedback-based retransmissions.

Specifically, in resource allocation Mode 2, the UE may be configured to determine a subset of resources from which a higher layer will select resources for physical sidelink shared channel (PSSCH) and/or physical sidelink control channel (PSCCH) transmissions. The UE may perform sensing and resource selection procedures to select proper resources. The UE may perform the sensing procedure in a sensing window for identifying candidate resources. The sensing window may be defined as a time interval where the UE is expected to monitor the medium before resource selection is triggered. The sensing procedure may include decoding sidelink control channel information, sidelink measurements and detection of sidelink transmissions to identify the occupied resources. The information extracted from SCI decoding may include current time/frequency resource allocation, reservation period, retransmission time gap, retransmission frequency resource allocation, and priority of the packet. In the sensing procedure, the UE may decode possible SCIs to extract information and measures RSRP to compare with a pre-configured RSRP threshold to identify the occupied resource. If the measured RSRP is less than a pre-configured threshold, the UE may assume the interference is tolerable and thus the same resource can be reused. If all SCIs can be decoded by the UE in each slot, the UE would have whole resources allocation information of current slot and resource reservation information of future slots. Then, the UE may be able to identify candidate resources within a resource selection window. The resource selection window may be defined as a time interval where the UE selects sidelink resources for transmission. The UE may identify the occupied resources in the resource selection window by the sensing procedure. The UE may obtain the available resources in resource selection window by excluding the occupied resources with RSRP larger than a predefined threshold. The UE may select available resources as resource candidates set. Then, the UE may perform resource selection from the identified candidate resources for transmission/retransmission.

Assuming that a set of candidate resources has passed RSRP-based resource exclusion procedure, the UE may be configured to select transmission resources from the candidate resources. Specifically, the UE may be configured to select a first transmission resource from the resource selection window. The UE may determine a maximum time gap and a minimum time gap. The UE may select a second transmission resource according to the maximum time gap and the minimum time gap. Then, the UE may inform the first selected transmission resource and the second selected transmission resource to at least one peer apparatus (e.g., one or multiple peer UE) through SCI. After determining the transmission resources from multiple transmission occasions, the UE may be configured to inform the selected transmission resources to other UEs via the SCI for reserving the selected resources. The SCI may carry resources allocation information of current slot and resource reservation information of future slots. Thus, the receiving UE may be able to exclude the selected/reserved resources and avoid interferences among each other.

According to the schemes of the present disclosure, the maximum time gap may be determined to ensure that the reserved resources signaled in one SCI are within 32 slots. Thus, the time gap between the second transmission resource and the first transmission resource should be within 32 slots. The minimum time gap may be determined to accommodate the HARQ round-trip time between transmissions. The maximum time gap and/or the minimum time gap may be configured by the network node in the V2X network or pre-configured in the UE. Therefore, the UE may be configured to select the transmission resources to meet the requirements such that the time gap between the second transmission resource and the first transmission resource is greater than the minimum time gap and the time gap between the second transmission resource and the first transmission resource is smaller than the maximum time gap. After determining the maximum time gap and the minimum time gap, the UE may be configured to perform resource selection according to several schemes proposed in the present disclosure.

Since NR V2X supports feedback-based HARQ retransmission, in order to make the feedback scheme effective, there should be a time gap between two transmissions which takes into account the HARQ round-trip time. On the other hand, NR V2X supports that one SCI can reserve up to $N_{MAX}$ (e.g., $N_{MAX}=2$ or 3) resources for a TB. After choosing the first resource, the Tx UE may choose another one or two resources. All reserved resources by an SCI are confined within a window of size 32 slots. Assume that one resource has been selected from the identified resources at slot n. For $N_{MAX}=2$, the second resource occurs at slot n+k, the value k satisfies that $-T_{max} \leq k \leq T_{max}$ and $|k| > T_{min}$. The parameter $T_{max}$ denotes the maximum time gap which is desirable for the constraint of 32 slots window size. $T_{max}$ may be determined as 31 for NR V2X. The parameter $T_{min}$ denotes the minimum time gap which is desirable for feedback-based retransmissions to take into account the HARQ round-trip time. $T_{min}$ may be determined based on the practical HARQ round-trip time.

In an event that the Tx UE intends to select more resources within the same trigger of resource selection for $N_{MAX}=2$, then the resource selection scheme in FIG. 1 may be used. FIG. 1 illustrates example scenarios 101, 102 and 103 under schemes in accordance with implementations of the present disclosure. Scenarios 101, 102 and 103 involve a plurality of UEs and a network node, which may be a part of a wireless communication network (e.g., an LTE network, an LTE-Advanced network, a 5G network, an NR network, an IoT network, or a V2X network). The parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, the UE may choose the (m+1)-th transmission resource uniformly at random from a subset of resource candidates satisfying the conditions $n_m \notin U_{i=0}^{m-1}[n_i-T_{min}, n_i+T_{min}]$ and the following criteria.

$$\min\{n_0, \ldots, n_{m-1}\} - T_{max} \leq n_m \leq \max\{n_0, \ldots, n_{m-1}\} + T_{max}$$

In scenario 101, the UE may firstly select a first transmission resource (e.g., transmission resource 0) within the selection window. The UE may continue to select a second transmission resource within the selection window. Once the first transmission resource is determined, the second transmission resource may be selected from the subset of candidate resources determined according to the maximum time gap, the minimum time gap and the first transmission resource. The subset of candidate resources comprises the resources between the maximum time gap greater than the first transmission resource and the maximum time gap less than the first transmission resource (e.g., the resources between two boundaries). The subset of candidate resources may further exclude all resources having a time gap less than the minimum time gap from the first transmission resource.

In scenario 102, the UE may select the second transmission resource (e.g., transmission resource 1) from the subset of candidate resources determined in scenario 101. The UE may continue to select a third transmission resource within the selection window. Once the second transmission resource is determined, the third transmission resource may be selected from the subset of candidate resources determined according to the maximum time gap, the minimum time gap, the first transmission resource and the second transmission resource. The subset of candidate resources may comprise resources between the maximum time gap greater than the second transmission resource (i.e., the maximum transmission resource in scenario 102) and the maximum time gap less than the first transmission resource (i.e., the minimum transmission resource in scenario 102). The subset of candidate resources may further exclude all resources having a time gap less than the minimum time gap from the first transmission resource and the second transmission resource. It should be noted that only the resources within the selection window can be considered as the candidate resources. The resources outside the selection window should be excluded from the candidate resources.

In scenario 103, the UE may select the third transmission resource (e.g., transmission resource 2) from the subset of candidate resources determined in scenario 102. Once the third transmission resource is determined, the next transmission resource may be selected from the subset of candidate resources determined according to the maximum time gap, the minimum time gap, the first transmission resource, the second transmission resource and the third transmission resource. The subset of candidate resources may comprise the resources between the maximum time gap greater than the third transmission resource (i.e., the maximum transmission resource in scenario 103) and the maximum time gap less than the first transmission resource (i.e., the minimum transmission resource in scenario 103). The subset of candidate resources may further exclude all resources having a time gap less than the minimum time gap from the first transmission resource, the second transmission resource, and the third transmission resource. Similarly, only the resources within the selection window can be considered as the candidate resources. The resources outside the selection window should be excluded from the candidate resources.

According to the resource selection scheme in FIG. 1, in the resource selection procedure, the UE may be able to determine a subset of candidate resources. The UE may select at least one transmission resource from the subset of candidate resources. The subset of candidate resources may comprise the resources between the maximum time gap greater than a maximum transmission resource and the maximum time gap less than a minimum transmission resource. The maximum transmission resource or the minimum transmission resource may be changed after a new transmission resource is selected. Then, the UE may inform the at least one transmission resource to the peer apparatus.

Figure 2:
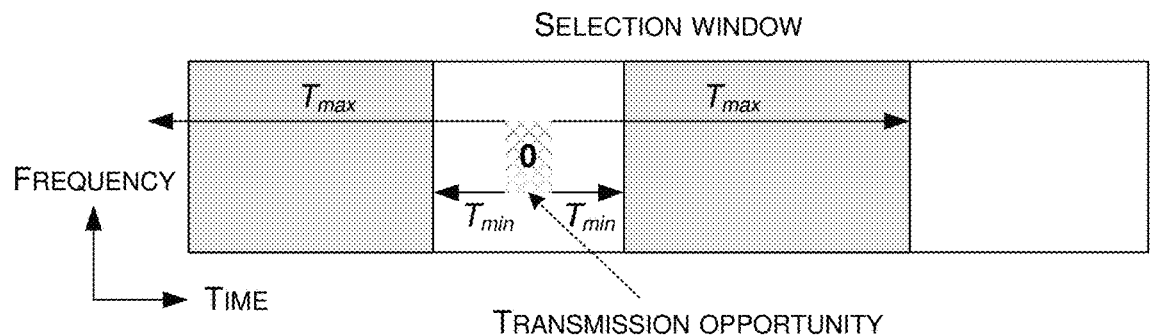
FIG. 2 is a diagram depicting example scenarios under schemes in accordance with implementations of the present disclosure.
Figure 2:
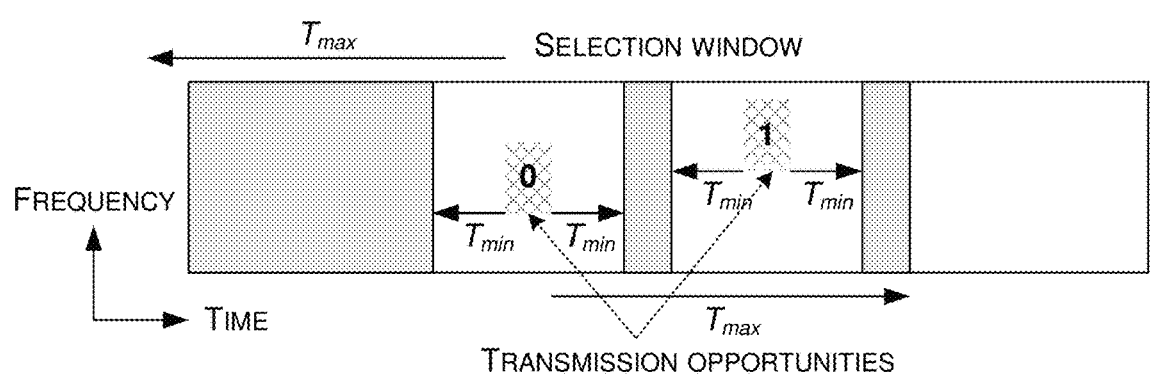
Figure 2:
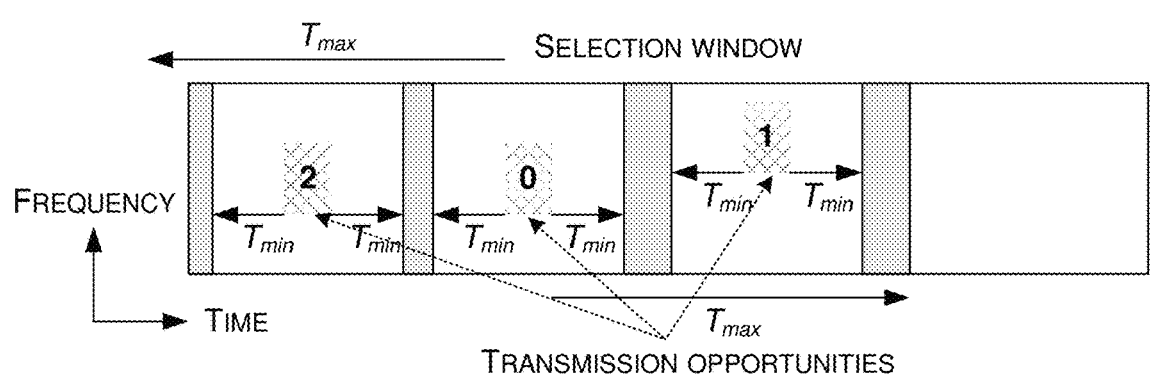

In an event that the Tx UE intends to select more resources within the same trigger of resource selection for $N_{MAX}=2$, then another resource selection scheme in FIG. 2 may be used. FIG. 2 illustrates example scenarios 201, 202 and 203 under schemes in accordance with implementations of the present disclosure. Scenarios 201, 202 and 203 involve a plurality of UEs and a network node, which may be a part of a wireless communication network (e.g., an LTE network, an LTE-Advanced network, a 5G network, an NR network, an IoT network, or a V2X network). Similarly, the parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, the UE may choose the (m+1)-th transmission resource uniformly at random from a subset of resource candidates satisfying the conditions $n_m \notin U_{i=0}^{m-1}[n_i-T_{min}, n_i+T_{min}]$ and the following criteria.

$$-T_{max} \leq n_m \leq T_{max}$$

In scenario 201, the UE may firstly select a first transmission resource (e.g., transmission resource 0) within the selection window. The UE may continue to select a second transmission resource within the selection window. Once the first transmission resource is determined, the second transmission resource may be selected from the subset of candidate resources determined according to the maximum time gap, the minimum time gap and the first transmission resource. The subset of candidate resources may comprise the resources between the maximum time gap greater than the first transmission resource and the maximum time gap less than the first transmission resource. The subset of candidate resources may further exclude all resources having a time gap less than the minimum time gap from the first transmission resource.

In scenario 202, the UE may select the second transmission resource (e.g., transmission resource 1) from the subset of candidate resources determined in scenario 201. The UE may continue to select a third transmission resource within the selection window. Once the second transmission resource is determined, the third transmission resource may be selected from the subset of candidate resources determined according to the maximum time gap, the minimum time gap and the first transmission resource. The subset of candidate resources may comprise the resources between the maximum time gap greater than the first transmission resource and the maximum time gap less than the first transmission resource. The subset of candidate resources may further exclude all resources having a time gap less than the minimum time gap from the first transmission resource and the second transmission resource. It should be noted that only the resources within the selection window can be considered as the candidate resources. The resources outside the selection window should be excluded from the candidate resources.

In scenario 203, the UE may select the third transmission resource (e.g., transmission resource 2) from the subset of candidate resources determined in scenario 202. Once the third transmission resource is determined, the next transmission resource may be selected from the subset of candidate resources determined according to the maximum time gap, the minimum time gap and the first transmission resource. The subset of candidate resources may comprise the resources between the maximum time gap greater than the first transmission resource and the maximum time gap less than the first transmission resource. The subset of candidate resources may further exclude all resources having a time gap less than the minimum time gap from the first transmission resource, the second transmission resource, and the third transmission resource. Similarly, only the resources within the selection window can be considered as the candidate resources. The resources outside the selection window should be excluded from the candidate resources.

According to the resource selection scheme in FIG. 2, in the resource selection procedure, the UE may be able to determine a subset of candidate resources. The UE may select at least one transmission resource from the subset of candidate resources. The subset of candidate resources may comprise the resources between the maximum time gap greater than the first transmission resource and the maximum time gap less than the first transmission resource. Then, the UE may inform the at least one transmission resource to the peer apparatus.

Figure 3:
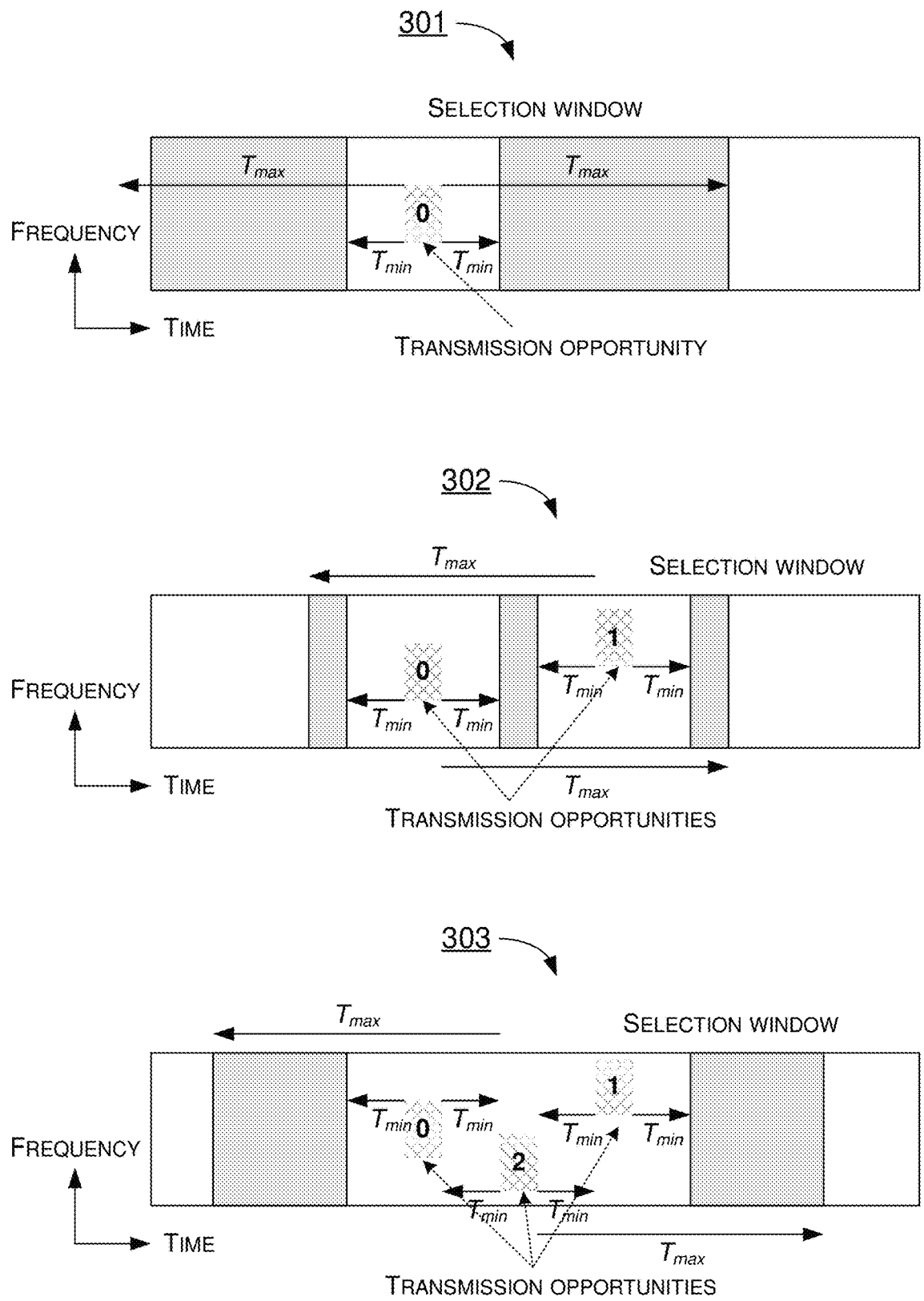
FIG. 3 is a diagram depicting example scenarios under schemes in accordance with implementations of the present disclosure.

In an event that the Tx UE intends to select more resources within the same trigger of resource selection for $N_{MAX}=3$, then another resource selection scheme in FIG. 3 may be used. FIG. 3 illustrates example scenarios 301, 302 and 303 under schemes in accordance with implementations of the present disclosure. Scenarios 301, 302 and 303 involve a plurality of UEs and a network node, which may be a part of a wireless communication network (e.g., an LTE network, an LTE-Advanced network, a 5G network, an NR network, an IoT network, or a V2X network). Similarly, the parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, the UE may choose the (m+1)-th transmission resource uniformly at random from a subset of resource candidates satisfying the conditions $n_m \notin U_{i=0}^{m-1}[n_i-T_{min}, n_i+T_{min}]$ and the following criteria.

$$n_{min,2}(m) - T_{max} \leq n_m \leq n_{max,2}(m) + T_{max}$$

For m=1, $n_{max,2}(1) = n_{min,2}(1) = n_0$. For m≥2, $n_{max,2}$ (M) and $n_{min,2}$ (m) are the second maximum and the second minimum of the slot sequence $n_0, \ldots, n_{m-1}$, respectively. For example, for m=2, $n_{min,2}(m)$=max $(n_0, n_1)$ and $n_{max,2}(m)$=min$(n_0, n_1)$.

In scenario 301, the UE may firstly select a first transmission resource (e.g., transmission resource 0) within the selection window. The UE may continue to select a second transmission resource within the selection window. Once the first transmission resource is determined, the second transmission resource may be selected from the subset of candidate resources determined according to the maximum time gap, the minimum time gap and the first transmission resource. The subset of candidate resources may comprise the resources between the maximum time gap greater than the first transmission resource and the maximum time gap less than the first transmission resource. The subset of candidate resources may further exclude all resources having a time gap less than the minimum time from the first transmission resource.

In scenario 302, the UE may select the second transmission resource (e.g., transmission resource 1) from the subset of candidate resources determined in scenario 301. The UE may continue to select a third transmission resource within the selection window. Once the second transmission resource is determined, the third transmission resource may be selected from the subset of candidate resources determined according to the maximum time gap, the minimum time gap, the first transmission resource and the second transmission resource. The subset of candidate resources may comprise the resources between the maximum time gap greater than the first transmission resource (i.e., the second maximum transmission resource in scenario 302) and the maximum time gap less than the second transmission resource (i.e., the second minimum transmission resource in scenario 302). The subset of candidate resources may further exclude all resources having a time gap less than the minimum time gap from the first transmission resource and the second transmission resource. It should be noted that only the resources within the selection window can be considered as the candidate resources. The resources outside the selection window should be excluded from the candidate resources.

In scenario 303, the UE may select the third transmission resource (e.g., transmission resource 2) from the subset of candidate resources determined in scenario 302. Once the third transmission resource is determined, the next transmission resource may be selected from the subset of candidate resources determined according to the maximum time gap, the minimum time gap, the first transmission resource, the second transmission resource and the third transmission resource. The subset of candidate resources may comprise the resources between the maximum time gap greater than the third transmission resource (i.e., the second maximum transmission resource in scenario 303) and the maximum time gap less than the third transmission resource (i.e., the second minimum transmission resource in scenario 303). The subset of candidate resources may further exclude all resources having a time gap less than the minimum time gap from the first transmission resource, the second transmission resource, and the third transmission resource. Similarly, only the resources within the selection window can be considered as the candidate resources. The resources outside the selection window should be excluded from the candidate resources.

According to the resource selection scheme in FIG. 3, in the resource selection procedure, the UE may be able to determine a subset of candidate resources. The UE may select at least one transmission resource from the subset of candidate resources. The subset of candidate resources may comprise the resources between the maximum time gap greater than a second maximum transmission resource and the maximum time gap less than a second minimum transmission resource. The second maximum transmission resource or the second minimum transmission resource may be changed after a new transmission resource is selected. Then, the UE may inform the at least one transmission resource to the peer apparatus.

In some implementations, in an event that the subset of candidate resources is empty (e.g., no resource is available), the UE may terminate the resource selection procedure and the corresponding TB may have only m transmissions. After selecting a plurality of transmission resources, the UE may sort the selected transmission resources in increasing order (e.g., ordered in time). The UE may transmit the selected transmission resources to the peer apparatus via the SCIs for reserving the selected transmission resources. Thus, the UE may select resources so that HARQ retransmission resources can be reserved by a prior SCI. Then, the UE may perform HARQ transmissions/retransmissions according to the selected transmission resources.

Illustrative Implementations

Figure 4:
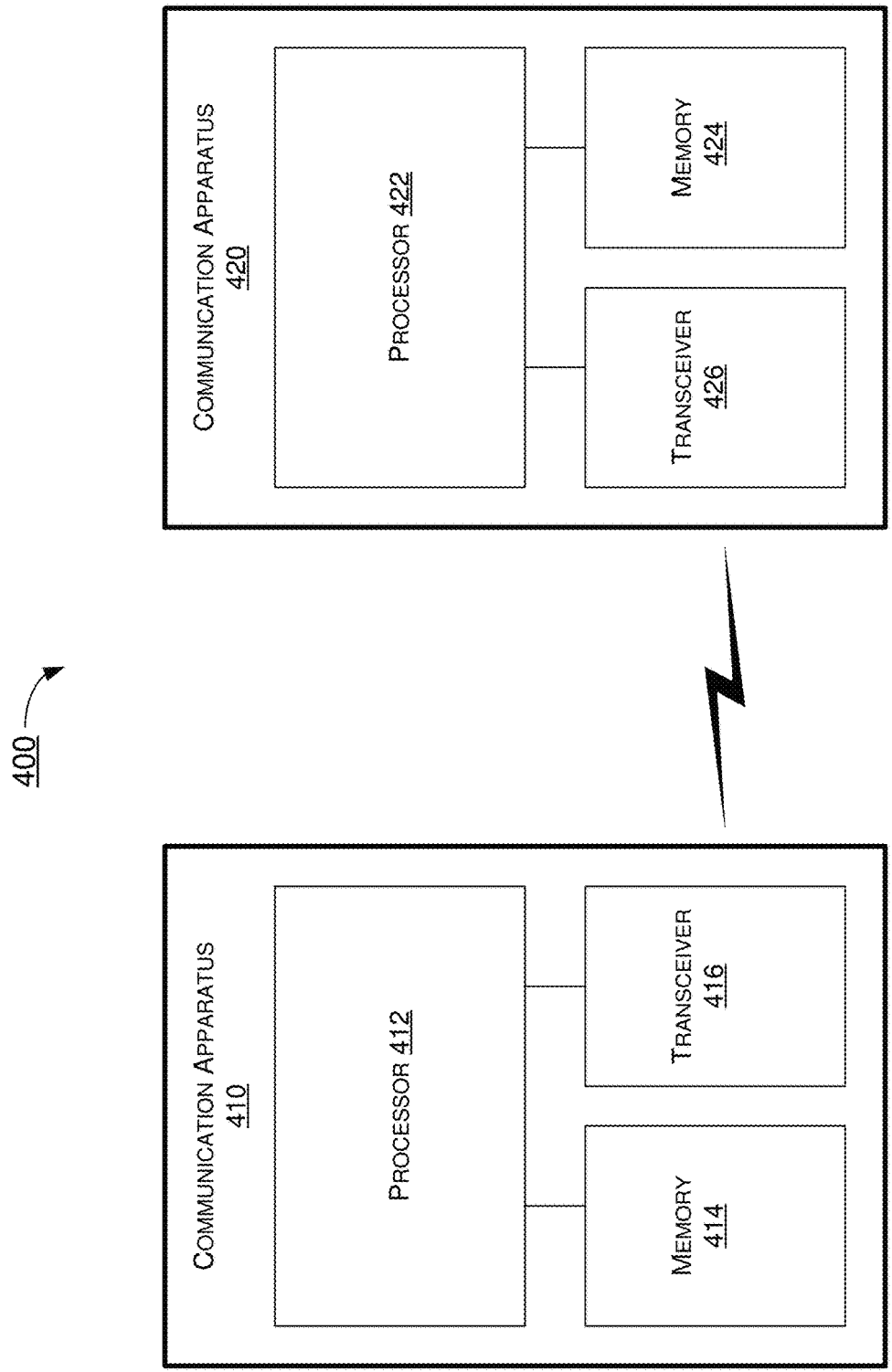
FIG. 4 is a block diagram of an example communication apparatus and an example network apparatus in accordance with an implementation of the present disclosure.

FIG. 4 illustrates an example communication apparatus 410 and communication apparatus 420 in accordance with an implementation of the present disclosure. Each of communication apparatus 410 and 420 may perform various functions to implement schemes, techniques, processes and methods described herein pertaining to resource selection of multiple transmission occasions in NR sidelink communications with respect to user equipment and network apparatus in wireless communications, including scenarios/schemes described above as well as process 500 described below.

Communication apparatus 410 and 420 may be a part of an electronic apparatus, which may be a UE such as a portable or mobile apparatus, a wearable apparatus, a wireless communication apparatus or a computing apparatus. For instance, communication apparatus 410 and 420 may be implemented in a vehicle, a smartphone, a smartwatch, a personal digital assistant, a digital camera, or a computing equipment such as a tablet computer, a laptop computer or a notebook computer. Communication apparatus 410 and 420 may also be a part of a machine type apparatus, which may be an IoT, NB-IoT, or IIoT apparatus such as an immobile or a stationary apparatus, a home apparatus, a wire communication apparatus or a computing apparatus. Alternatively, communication apparatus 410 and 420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 and 420 may include at least some of those components shown in FIG. 4 such as a processor 412/422, for example. Communication apparatus 410 and 420 may further include one or more other components not pertinent to the proposed scheme of the present disclosure (e.g., internal power supply, display device and/or user interface device), and, thus, such component(s) of communication apparatus 410 and 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410 and 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, communication apparatus 420 may further include a memory 424 coupled to processor 422 and capable of being accessed by processor 422 and storing data therein. Accordingly, communication apparatus 410 420 may wirelessly communicate with each other via transceiver 416 and transceiver 426, respectively. To aid better understanding, the following description of the operations, functionalities and capabilities of each of communication apparatus 410 and 420 is provided in the context of a mobile communication environment in which communication apparatus 410 and 420 are implemented in or as a communication apparatus or a UE of a communication network.

In some implementations, after a set of candidate resources has passed RSRP-based resource exclusion procedure, processor 412 may be configured to select transmission resources from the candidate resources. Specifically, processor 412 may be configured to select a first transmission resource from the resource selection window. Processor 412 may determine a maximum time gap and a minimum time gap. Processor 412 may select a second transmission resource according to the maximum time gap and the minimum time gap. Then, processor 412 may inform, via transceiver 416, the first transmission resource and the second transmission resource to communication apparatus 420 (e.g., a peer UE). After determining the transmission resources from multiple transmission occasions, processor 412 may be configured to inform, via transceiver 416, the selected transmission resources to other apparatus via the SCI for reserving the selected resources. The SCI may carry resources allocation information of current slot and resource reservation information of future slots. Thus, the receiving apparatus may be able to exclude the selected/reserved resources and avoid interferences among each other.

In some implementations, processor 412 may determine the maximum time gap to ensure that the reserved resources signaled in one SCI are within 32 slots. Processor 412 may determine the minimum time gap to accommodate the HARQ round-trip time between transmissions. The maximum time gap and/or the minimum time gap may be configured by a network apparatus in a V2X network or pre-configured in memory 414. Therefore, processor 412 may be configured to select the transmission resources to meet the requirements such that the time gap between the second transmission resource and the first transmission resource is greater than the minimum time gap and the time gap between the second transmission resource and the first transmission resource is smaller than the maximum time gap. After determining the maximum time gap and the minimum time gap, processor 412 may be configured to perform resource selection according to several schemes proposed in the present disclosure.

In some implementations, in an event that processor 412 intends to select more resources within the same trigger of resource selection for $N_{MAX}=2$, then the following resource selection scheme may be used. The parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, processor 412 may choose the (m+1)-th transmission resource uniformly at random from a subset of resource candidates satisfying the conditions $n_m \notin U_{i=0}^{m-1}[n_i-T_{min}, n_i+T_{min}]$ and the following criteria.

$$\min\{n_0, \ldots, n_{m-1}\} - T_{max} \leq n_m \leq \max\{n_0, \ldots, n_{m-1}\} + T_{max}$$

Processor 412 may be configured to determine a subset of candidate resources. Processor 412 may select at least one transmission resource from the subset of candidate resources. The subset of candidate resources may comprise the resources between the maximum time gap greater than a maximum transmission resource and the maximum time gap less than a minimum transmission resource. The maximum transmission resource or the minimum transmission resource may be changed after a new transmission resource is selected. Then, processor 412 may inform, via transceiver 416, the at least one transmission resource to communication apparatus 420.

In some implementations, in an event that processor 412 intends to select more resources within the same trigger of resource selection for $N_{MAX}=2$, then another resource selection scheme may be used. The parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, processor 412 may choose the (m+1)-th transmission resource uniformly at random from a subset of resource candidates satisfying the conditions $n_m \notin U_{i=0}^{m-1}[n_i-T_{min}, n_i+T_{min}]$ and the following criteria.

$$-T_{max} \leq n_m \leq T_{max}$$

Processor 412 may be configured to determine a subset of candidate resources. Processor 412 may select at least one transmission resource from the subset of candidate resources. The subset of candidate resources may comprise the resources between the maximum time gap greater than the first transmission resource and the maximum time gap less than the first transmission resource. Then, processor 412 may inform, via transceiver 416, the at least one transmission resource to communication apparatus 420.

In some implementations, in an event that processor 412 intends to select more resources within the same trigger of resource selection for $N_{MAX}=3$, then another resource selection scheme may be used. The parameter $n_m$ denotes the (m+1)-th transmission resource. The parameter $T_{max}$ denotes the maximum time gap. The parameter $T_{min}$ denotes the minimum time gap. Assuming that the first m transmission resources have been determined, processor 412 may choose the (m+1)-th transmission resource uniformly at random from a subset of resource candidates satisfying the conditions $n_m \notin U_{i=0}^{m-1} [n_i - T_{min}, n_i + T_{min}]$ and the following criteria.

$$n_{min,2}(m) - T_{max} \leq n_m \leq n_{max,2}(m) + T_{max}$$

For m=1, $n_{max,2}(1) = n_{min,2}(1) = n_0$. For m≥2, $n_{max,2}(m)$ and $n_{min,2}(m)$ are the second maximum and the second minimum of the slot sequence $n_0, \ldots, n_{m-1}$, respectively. For example, for m=2, $n_{min,2}(m) = \max(n_0, n_1)$ and $n_{max,2}(m) = \min(n_0, n_1)$. Processor 412 may be configured to determine a subset of candidate resources. Processor 412 may select at least one transmission resource from the subset of candidate resources. The subset of candidate resources may comprise the resources between the maximum time gap greater than a second maximum transmission resource and the maximum time gap less than a second minimum transmission resource. The second maximum transmission resource or the second minimum transmission resource may be changed after a new transmission resource is selected. Then, processor 412 may inform, via transceiver 416, the at least one transmission resource to communication apparatus 420.

In some implementations, in an event that the subset of candidate resources is empty (e.g., no resource is available), processor 412 may terminate the resource selection procedure and the corresponding TB may have only m transmissions. After selecting a plurality of transmission resources, processor 412 may sort the selected transmission resources in increasing order (e.g., ordered in time). Processor 412 may transmit, via transceiver 416, the selected transmission resources to communication apparatus 420 via the SCI for reserving the selected transmission resources. Thus, processor 412 may select resources so that HARQ retransmission resources can be reserved by a prior SCI. Then, processor 412 may perform HARQ transmissions/retransmissions according to the selected transmission resources.

Illustrative Processes

Figure 5:
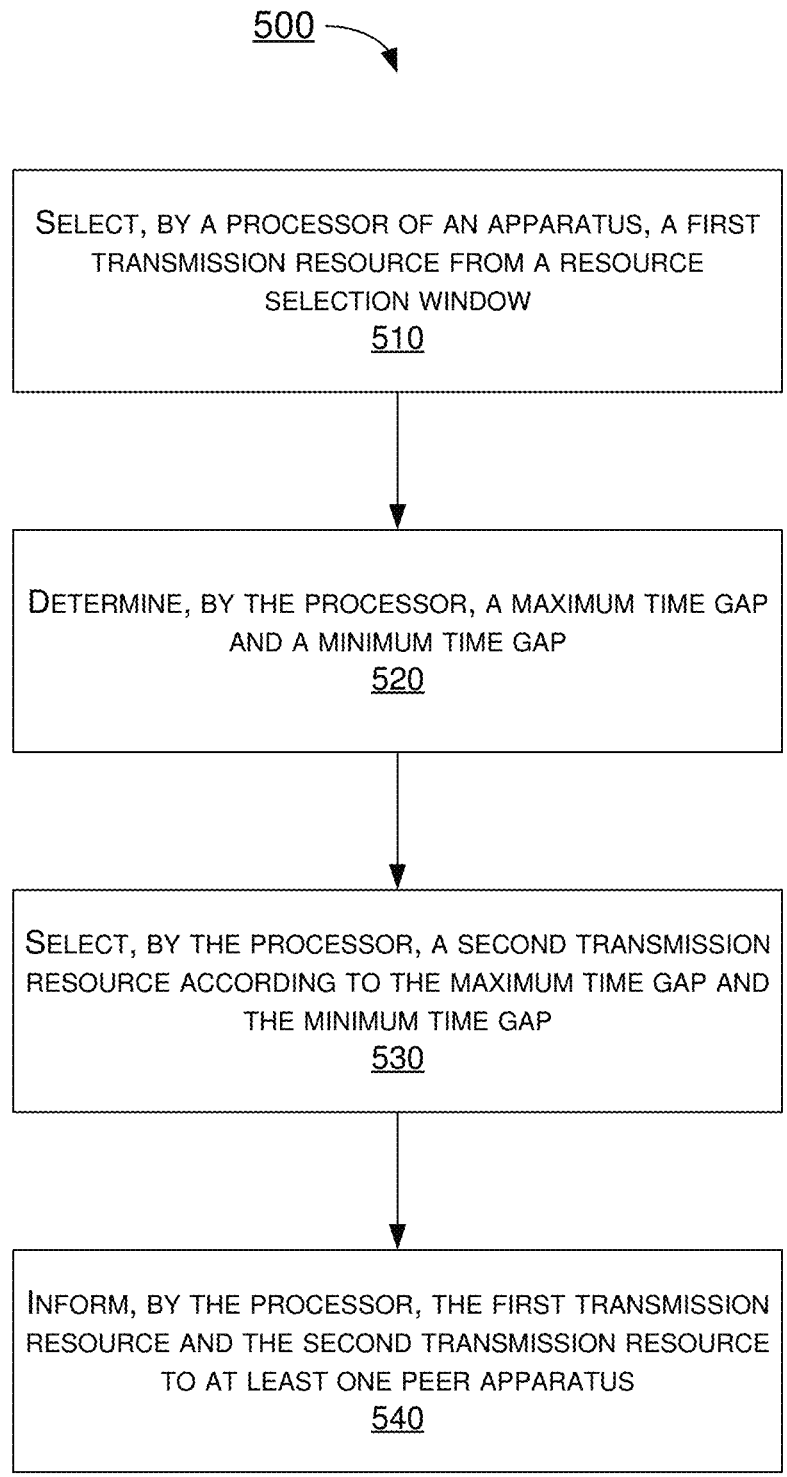
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to resource selection of multiple transmission occasions in NR sidelink communications with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable network nodes or network elements. Solely for illustrative purposes and without limitation, process 500 is described below in the context of network apparatus 410. Process 500 may begin at block 510.

At 510, process 500 may involve processor 412 of apparatus 410 selecting a first transmission resource from a resource selection window. Process 500 may proceed from 510 to 520.

At 520, process 500 may involve processor 412 determining a maximum time gap and a minimum time gap. Process 500 may proceed from 520 to 530.

At 530, process 500 may involve processor 412 selecting a second transmission resource according to the maximum time gap and the minimum time gap. Process 500 may proceed from 530 to 540.

At 540, process 500 may involve processor 412 informing the first transmission resource and the second transmission resource to a peer apparatus.

In some implementations, a time gap between the second transmission resource and the first transmission resource is greater than the minimum time gap.

In some implementations, a time gap between the second transmission resource and the first transmission resource is smaller than the maximum time gap.

In some implementations, process 500 may involve processor 412 determining a subset of candidate resources. Process 500 may also involve processor 412 selecting at least one transmission resource from the subset of candidate resources. Process 500 may further involve processor 412 informing the at least one transmission resource to the peer apparatus. The subset of candidate resources may comprise the resources between the maximum time gap greater than a maximum transmission resource and the maximum time gap less than a minimum transmission resource.

In some implementations, process 500 may involve processor 412 determining a subset of candidate resources. Process 500 may also involve processor 412 selecting at least one transmission resource from the subset of candidate resources. Process 500 may further involve processor 412 informing the at least one transmission resource to the peer apparatus. The subset of candidate resources may comprise the resources between the maximum time gap greater than the first transmission resource and the maximum time gap less than the first transmission resource.

In some implementations, process 500 may involve processor 412 determining a subset of candidate resources. Process 500 may also involve processor 412 selecting at least one transmission resource from the subset of candidate resources. Process 500 may further involve processor 412 informing the at least one transmission resource to the peer apparatus. The subset of candidate resources may comprise the resources between the maximum time gap greater than a second maximum transmission resource and the maximum time gap less than a second minimum transmission resource.

In some implementations, process 500 may involve processor 412 informing a selected transmission resource to the peer apparatus via a sidelink control information to reserve the selected transmission resource.

In some implementations, a time gap between the second transmission resource and the first transmission resource is within 32 slots.

In some implementations, the minimum time gap is reserved to accommodate a HARQ round-trip time.

In some implementations, the maximum time gap and the minimum time gap may be pre-configured or received from a network node in a V2X network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   selecting, by a processor of an apparatus, a first transmission resource from a resource selection window;
   determining, by the processor, a maximum time gap and a minimum time gap; and
   selecting, by the processor, a second transmission resource according to the maximum time gap and the minimum time gap such that a time gap between the first transmission resource and the second transmission resource is greater than the minimum time gap,
   wherein the maximum time gap limits that reserved resources signaled in one sidelink control information (SCI) signaling are within 32 slots.

2. The method of claim 1, wherein a time gap between the second transmission resource and the first transmission resource is smaller than the maximum time gap.

3. The method of claim 1, further comprising:
   determining, by the processor, a subset of candidate resources;
   selecting, by the processor, at least one transmission resource from the subset of candidate resources; and
   informing, by the processor, the at least one transmission resource to the at least one peer apparatus,
   wherein the subset of candidate resources comprises resources between the maximum time gap greater than a maximum transmission resource and the maximum time gap less than a minimum transmission resource.

4. The method of claim 1, further comprising:
   determining, by the processor, a subset of candidate resources;
   selecting, by the processor, at least one transmission resource from the subset of candidate resources; and
   informing, by the processor, the at least one transmission resource to the at least one peer apparatus,
   wherein the subset of candidate resources comprises resources between the maximum time gap greater than the first transmission resource and the maximum time gap less than the first transmission resource.

5. The method of claim 1, further comprising:
   determining, by the processor, a subset of candidate resources;
   selecting, by the processor, at least one transmission resource from the subset of candidate resources; and
   informing, by the processor, the at least one transmission resource to the at least one peer apparatus,
   wherein the subset of candidate resources comprises resources between the maximum time gap greater than a second maximum transmission resource and the maximum time gap less than a second minimum transmission resource.

6. The method of claim 1, further comprising:
informing, by the processor, a selected transmission resource to the at least one peer apparatus via a sidelink control information to reserve the selected transmission resource.

7. The method of claim 1, wherein the minimum time gap is reserved to accommodate a hybrid automatic repeat request (HARQ) round-trip time.

8. The method of claim 1, wherein the maximum time gap and the minimum time gap are pre-configured or received from a network node in a vehicle to everything (V2X) network.

9. An apparatus, comprising:
a transceiver which, during operation, wirelessly communicates with network nodes of a wireless network; and
a processor communicatively coupled to the transceiver such that, during operation, the processor performs operations comprising:
selecting a first transmission resource from a resource selection window;
determining a maximum time gap and a minimum time gap; and
selecting a second transmission resource according to the maximum time gap and the minimum time gap such that a time gap between the first transmission resource and the second transmission resource is greater than the minimum time gap,
wherein the maximum time gap limits that reserved resources signaled in one sidelink control information (SCI) signaling are within 32 slots.

10. The apparatus of claim 9, wherein a time gap between the second transmission resource and the first transmission resource is smaller than the maximum time gap.

11. The apparatus of claim 9, wherein, during operation, the processor further performs operations comprising:
determining a subset of candidate resources;
selecting at least one transmission resource from the subset of candidate resources; and
informing, via the transceiver, the at least one transmission resource to the at least one peer apparatus,
wherein the subset of candidate resources comprises resources between the maximum time gap greater than a maximum transmission resource and the maximum time gap less than a minimum transmission resource.

12. The apparatus of claim 9, wherein, during operation, the processor further performs operations comprising:
determining a subset of candidate resources;
selecting at least one transmission resource from the subset of candidate resources; and
informing, via the transceiver, the at least one transmission resource to the at least one peer apparatus,
wherein the subset of candidate resources comprises resources between the maximum time gap greater than the first transmission resource and the maximum time gap less than the first transmission resource.

13. The apparatus of claim 9, wherein, during operation, the processor further performs operations comprising:
determining a subset of candidate resources;
selecting at least one transmission resource from the subset of candidate resources; and
informing, via the transceiver, the at least one transmission resource to the at least one peer apparatus,
wherein the subset of candidate resources comprises resources between the maximum time gap greater than a second maximum transmission resource and the maximum time gap less than a second minimum transmission resource.

14. The apparatus of claim 9, wherein, during operation, the processor further performs operations comprising:
informing, via the transceiver, a selected transmission resource to the at least one peer apparatus via a sidelink control information to reserve the selected transmission resource.

15. The apparatus of claim 9, wherein the minimum time gap is reserved to accommodate a hybrid automatic repeat request (HARQ) round-trip time.

16. The apparatus of claim 9, wherein the maximum time gap and the minimum time gap are pre-configured or received from a network node in a vehicle to everything (V2X) network.

* * * * *